Figure 1:
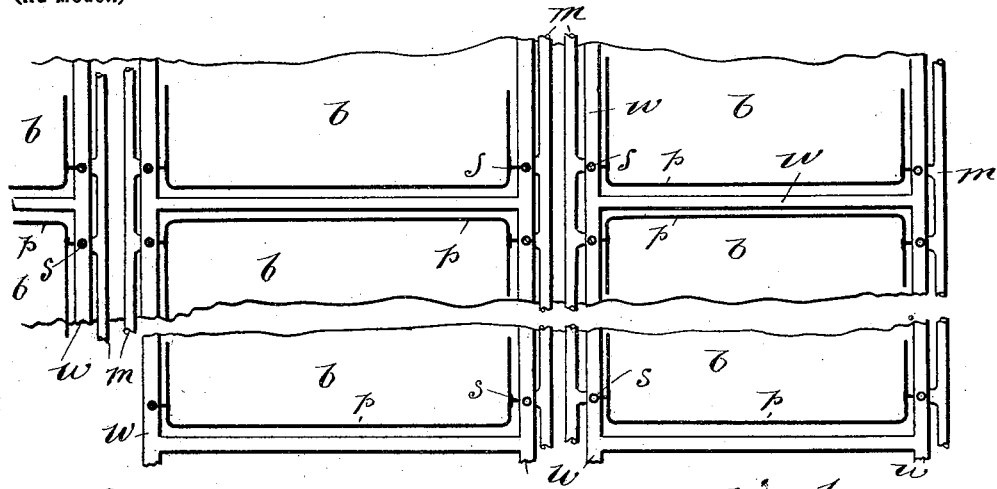

No. 705,740. Patented July 29, 1902.
L. K. DAVIS.
PROCESS OF PROTECTING EXPOSED FILTERS OR OTHER CONFINED LIQUID BODIES FROM FREEZING.
(Application filed Mar. 5, 1900. Renewed Jan. 14, 1902.)
(No Model.)

Witnesses:
Inventor,
Lewis K. Davis

UNITED STATES PATENT OFFICE.

LEWIS K. DAVIS, OF INDIANAPOLIS, INDIANA.

PROCESS OF PROTECTING EXPOSED FILTERS OR OTHER CONFINED LIQUID BODIES FROM FREEZING.

SPECIFICATION forming part of Letters Patent No. 705,740, dated July 29, 1902.

Application filed March 5, 1900. Renewed January 14, 1902. Serial No. 89,730. (No specimens.)

*To all whom it may concern:*

Be it known that I, LEWIS K. DAVIS, post-office address and residence Indianapolis, Indiana, have invented certain new and useful Improvements in Processes of Protecting Exposed Filters or other Confined Liquid Bodies from Freezing, of which the following is a description illustrated by drawings of one type of the invention.
I will describe my invention in relation to a particular type of filter-beds to which it is peculiarly fitted, and from this the nature of the invention as applied under other conditions should be readily apprehended. Suppose we have a filter-bed or a number of them each an acre in extent and containing the filtering layers of sand, &c., covered by a foot or two of water. It is essential to keep such a body of water from freezing not only because of the mechanical troubles that arise from the ice, but also because the ice forms a substantially air-tight cover to the water, and it is highly desirable that freedom to absorb oxygen from the air should not be interrupted. It is neither practical nor desirable to directly protect the whole surface of the water by lattice-work or gridwork of heating-pipes. I have discovered that it is sufficient if ice is prevented from forming at the margin of the body of water, because, as is well known, crystallization does not take place readily in a body of liquid unless there are solid particles from which the crystals may start. Applying this principle to the practical problem of preventing the freezing of such a body of water I have discovered that if heat be supplied just beneath the surface and around the margin, preferably the entire margin, of the body of water the fact that the ice crystals are thus prevented from forming on the walls of the filter or even if they form are prevented from crossing the line of heated water made by the steam-pipe or other heating agency used in itself indirectly prevents the formation of ice in the central portions of the surface of the water, because there are no solid points there present to facilitate the crystallization. In addition to this indirect effect the heating of the marginal portions of the surface of the water may and I believe does cause a circulation along the surface of the water from the margins toward the middle, though I do not pretend to account for this in the face of the fact that water at a temperature between 32° and 40° Fahrenheit, if pure, is heavier than water at the freezing-point, 32°. It is possible, therefore, that the circulation may take place by the falling down of the slightly-warm water and its flow along the surface of the sand or other filtering substance and toward the center of the body of water and by a countercurrent at the surface.

Figure 2:
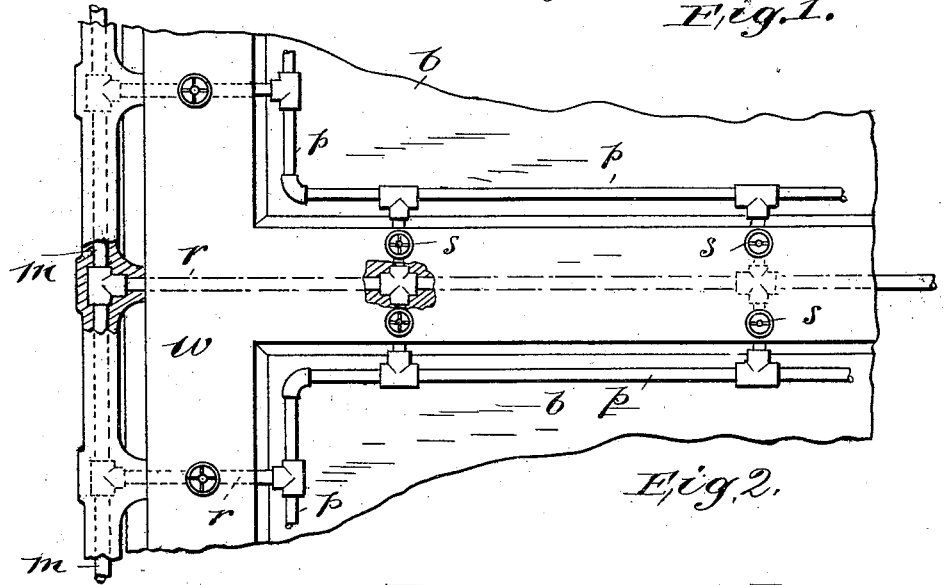
Figure 3:
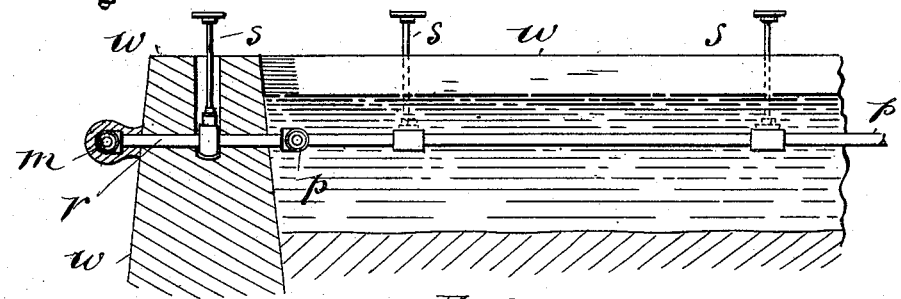

In the drawings, Figure 1 is a small-scale plan view of a portion of four such filter-beds as I have described, one of them being marked *b*. One or more steam-pipes *p* extend around the entire margin. Fig. 2 is a detail partial plan view on a larger scale, and Fig. 3 is a partial vertical sectional view.

The steam-pipe *p* in the system illustrated must be open at some point, so as to allow the condensed steam to run out, no return or exhaust pipe being shown. This pipe *p* is placed only a few inches beneath the surface and preferably only an inch or two from the wall *w* of the filter. It is supplied with steam and is also supported by the pipes *r*, provided with inlet-valves *s*, as shown. The pipes *r* are supplied from mains *m*, which are preferably heavily protected by asbestos or other non-conducting material, as shown.

When the cold weather is over, the pipes *p* may be disconnected from the pipes *r* and entirely removed from the filters. Owing, however, to their being arranged annularly—that is to say, only around the edge or margin of the water—they do not interfere with the removal or the washing of the sand bed or filter *f*.

As this application refers exclusively to my improvement in the art, I want it to be clearly understood that I seek protection for my improvement in the apparatus or article of manufacture in another patent application.

Having now fully set forth and explained one form of my invention, I claim as the novel features that characterize it the following:

1. The improvement in the art of preventing exposed filters and other confined liquid bodies from freezing, which consists in supplying heat beneath the surface at or near the vertical confining-walls and causing a circulation of the relatively heated water from such points, whereby the marginal portions of the liquid are prevented from freezing, and the more central open surface protected thereby.

2. The improvement in the art of preventing exposed filters and other confined liquid bodies from freezing, which consists in heating marginal portions of the liquid and causing a circulation to take place from such marginal portions and toward the center, substantially as and for the purposes set forth.

3. The improvement in the art of preventing exposed filters and other confined liquid bodies from freezing, which consists in supplying heat in an annular line beneath the surface of the liquid and substantially at its margin, for the purposes set forth.

Signed this 15th day of January, 1900, at New York, N. Y.

LEWIS K. DAVIS.

Witnesses:
EDWARD A. FRESHMAN,
HAROLD BINNEY.